US009972109B2

(12) United States Patent
Gilra

(10) Patent No.: US 9,972,109 B2
(45) Date of Patent: May 15, 2018

(54) IMPLEMENTING OUT OF ORDER ACCESS TO REVERSAL OPERATIONS IN IMAGES

(71) Applicant: Adobe Systems Incorporated, San Jose, CA (US)

(72) Inventor: Anant Gilra, Sunnyvale, CA (US)

(73) Assignee: Adobe Systems Incorporated, San Jose, CA (US)

( * ) Notice: Subject to any disclaimer, the term of this patent is extended or adjusted under 35 U.S.C. 154(b) by 256 days.

(21) Appl. No.: 14/814,273

(22) Filed: Jul. 30, 2015

(65) Prior Publication Data
US 2017/0032552 A1 Feb. 2, 2017

(51) Int. Cl.
G06F 3/0484 (2013.01)
G06T 11/60 (2006.01)

(52) U.S. Cl.
CPC .......... G06T 11/60 (2013.01); G06F 3/04845 (2013.01); G06F 3/04847 (2013.01); G06T 2200/24 (2013.01)

(58) Field of Classification Search
CPC .................................................... G06F 3/0484
See application file for complete search history.

(56) References Cited

U.S. PATENT DOCUMENTS

| 4,901,222 A * | 2/1990 | Joyce .................. G06F 9/30076 |
| | | 712/E9.032 |
| 5,148,530 A * | 9/1992 | Joyce .................... G06F 9/3005 |
| | | 708/672 |
| 2002/0109734 A1 * | 8/2002 | Umezu .................... G01R 13/00 |
| | | 715/846 |
| 2005/0086648 A1 * | 4/2005 | Andrews ............. G06F 11/3608 |
| | | 717/135 |
| 2010/0281362 A1 * | 11/2010 | Bailor ...................... G06F 17/24 |
| | | 715/256 |
| 2011/0010350 A1 * | 1/2011 | Bhogal ............. G06F 17/30067 |
| | | 707/695 |
| 2013/0013400 A1 * | 1/2013 | Kim .................... G06Q 30/0241 |
| | | 705/14.49 |
| 2013/0198609 A1 * | 8/2013 | Mokhtarzada .......... G06F 3/048 |
| | | 715/234 |
| 2013/0346898 A1 * | 12/2013 | Kokemohr ............ G06F 3/0482 |
| | | 715/769 |
| 2014/0222916 A1 * | 8/2014 | Foley ................... G06Q 10/101 |
| | | 709/204 |
| 2015/0039566 A1 * | 2/2015 | Baumann .............. G06F 9/4443 |
| | | 707/684 |
| 2017/0032552 A1 * | 2/2017 | Gilra ....................... G06T 11/60 |

* cited by examiner

Primary Examiner — David Choi
(74) Attorney, Agent, or Firm — Finch & Maloney PLLC

(57) ABSTRACT

A computing device is provided. The computing device includes a memory, at least one processor coupled to the memory and an action undo module executable by the processor. The action undo module is configured to receive user input requesting a target session of one or more sessions be undone. Each session of the one or more sessions includes at least one identifier of at least one tile that is affected by a respective action. The target session includes an identifier of a target action having affected one or more tiles identified in a collateral session of the one or more sessions. The collateral session includes an identifier of a collateral action. In one embodiment, the target session is lower in the first stack than the collateral session and the action undo module is configured to undo the collateral action and undo the target action.

20 Claims, 8 Drawing Sheets

IMPLEMENTING OUT OF ORDER ACCESS TO REVERSAL OPERATIONS IN IMAGES

FIELD OF THE DISCLOSURE

This disclosure relates to systems and methods of editing content, and more particularly, to techniques for reversing edits to image content.

BACKGROUND

The software industry has developed numerous programs to allow users to generate or edit various types of content. This content may include drawings or other images, video, text, and the like. The programs provide many benefits in generating and editing content. For example, image editing programs enable users to create new images or alter existing images. User initiated changes to these images may include adding shapes, adding text, numbers, or other symbols, and shading, blurring, or filtering features of an image. Some programs also provide users with the ability to undo changes made to the images in an order that is opposite the order in which the changes were made. Some programs also provide users with the ability to redo previously undone changes in an order that is opposite the order in which the changes were undone.

DETAILED DESCRIPTION

Figure 1:
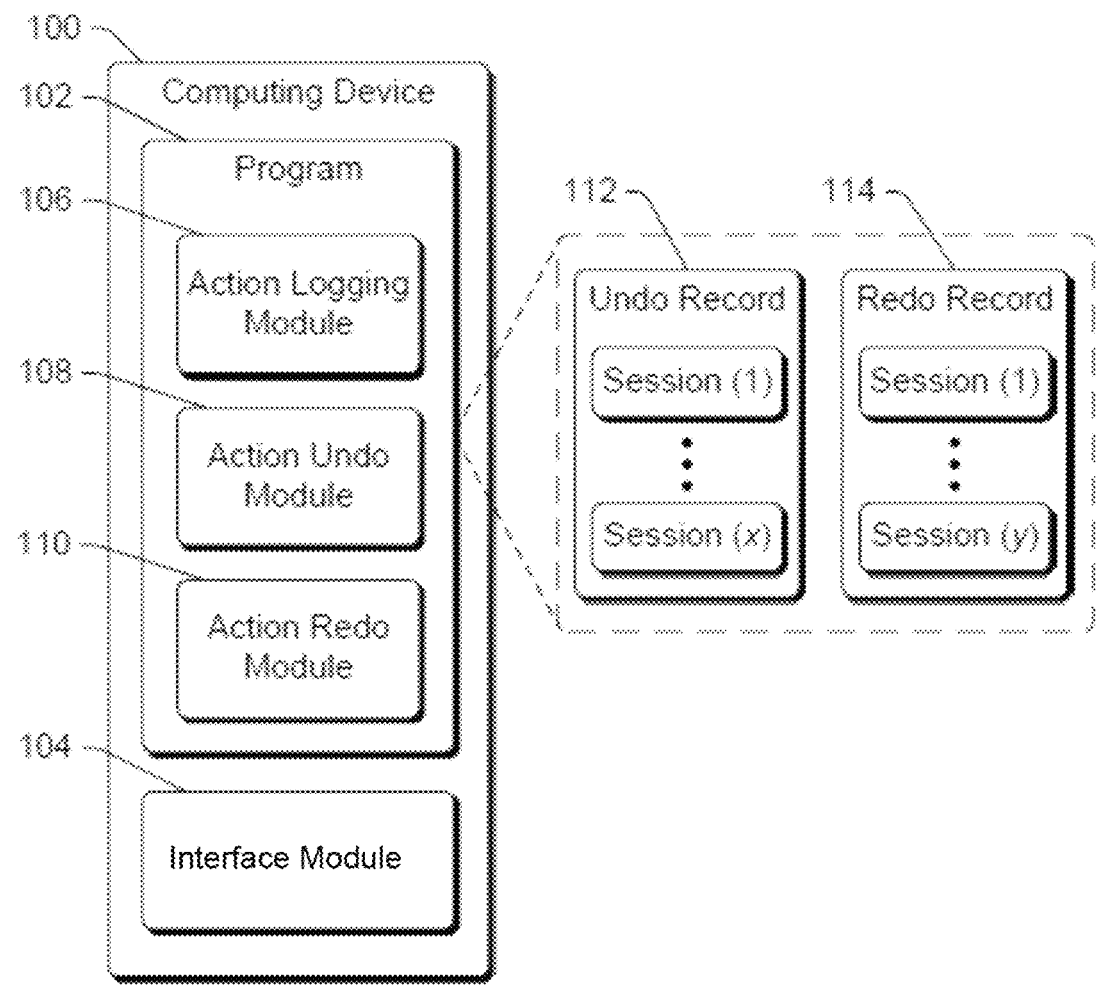
FIG. 1 is a block diagram illustrating an example computing device implementing out of order access to reversal operations in accordance with one or more embodiments of the present disclosure.

Example embodiments disclosed herein manifest an appreciation for particular shortcomings in conventional image content editing programs. For instance, many programs allow users to undo changes made to image content. However, such undoing of changes is executed in an order opposite to the order in which the changes were made. This design behavior can result in user frustration and dissatisfaction because the undoing of an identified change sometimes requires undoing more recently made, intervening changes, even where those intervening changes are unrelated to the identified change and/or otherwise believed to be good changes.

Thus, in accordance with some examples of the present disclosure, techniques are described for providing out of order access to reversal operations (e.g., undo operations and redo operations). Implementation of these techniques release a user from a linear time-based editing paradigm into a non-linear "tile" based approach that allows the editor much more freedom and efficiency in re-touching. This is so because, using these techniques, a user can select one or more specific tiles that have been affected by previously executed actions and precisely identify a previous action to be undone, regardless of whether the previous action was the most recent action or the first action affecting the tile since the image file was last saved. In this way, the techniques disclosed herein enable a user to leave desirable actions to particular tiles in place, while undoing undesirable actions to other tiles.

In some embodiments, a program accesses and executes various different editing actions on data descriptive of image content. These editing actions alter the data, thereby changing the content. Examples of alterations brought about by one or more editing actions include, for instance, adding a drawing, changing colors in an image, changing shadows or filtering of portions of an image, and the like.

In some embodiments, each action executed by the program operates on and affects one or more collections of image information. Each of these collections is referred to herein as a "tile group." A tile group may include or refer to a portion (e.g., a proper subset) of the image information that represents an entire image being edited or may include or refer to all of the image information that represents the entire image. Tile groups enable some embodiments disclosed herein to operate more efficiently than conventional technology, where tile groups are not used to index image content.

In some embodiments, each tile group includes one or more tiles. Each tile describes a fixed portion (e.g., a proper subset) of the image information included in or referred to by the tile group to which the tile belongs. In some embodiments, tiles are created by segmenting an image into equal portions along x and y axes. Each tile group is created by an action and each tile group spans one or more tiles with pixels affected by the action. For example, as a user brushes over a region of an image that includes one or more tiles, each tile affected by the brush becomes part of a tile group. So even where only a small portion of a particular tile (e.g., 5%) is affected by the brush, that particular tile is included in the tile group. Tiles and tile groups, within the context of a particular example, are described further below with reference to FIG. 6.

To track actions executed by the program, some embodiments generate information that associates each executed action with a tile group affected by the action. Some embodiments store session information in a data structure referred to herein as a "session." The session data structure may include an identifier of an action and one or more identifiers of tile groups affected by the action.

In some embodiments, sessions are stored in an undo record. The undo record may store sessions in a data structure that arranges the sessions in a last in first out (LIFO) order. Where the sessions are stored in a LIFO order, the session at the top of the undo record (also referred to herein as the "topmost undo session") is the session that was most recently added to the undo record (or percolated to the top of the undo record, as discussed in more detail below).

In some embodiments, techniques for automatically determining dependencies between actions are provided. In these embodiments, once a user has selected a session identifying a selected action to be undone, the system identifies one or more collateral sessions identifying collateral actions upon which the selected action is dependent. This dependency exists where the collateral actions were executed prior to the selected action, and the collateral actions affect one or more tiles affected by the selected action. In some embodiments, collateral actions are automatically undone prior to the undoing of the selected action, so that the proper state of image data is brought about.

Thus, in response to receiving user input requesting an undo operation, some embodiments search the undo record for sessions that include an identifier of a tile group identified in the undo operation request. In these embodiments, search results listing sessions with actions affecting tiles within the tile group are provided to the user. The user may select a session listed in the search results to be undone. In response to receiving user input selecting the listed session, these embodiments iteratively move collateral sessions upon which the selected session depends and, in turn, the selected session to the topmost undo session. Within each iteration, these embodiments access the topmost undo session, and undo the action on the tile group as identified within the topmost undo session.

In some embodiments, a redo operation is supported using the techniques discussed herein, allowing a previously undone action to be redone (essentially undoing, or reversing, the undo operation). In response to receiving user input requesting a redo operation, some embodiments search the redo record, identify a selected session and collateral sessions, percolate the selected session and collateral sessions, and redo the actions referenced in the selected session and collateral sessions, all in a manner analogous to the execution of the undo operation described above.

Thus, a user can access any previous actions in any order desired, and can select one or more actions for undoing. Similarly, undone actions can be selected to be redone. Numerous use cases and variations of this functionality will be apparent in light of this disclosure. One example performance scenario is as follows, according to an embodiment. Editable content is divided into a grid of tiles. Subsequently, an editing action modifies one or more tiles, depending on the pixels impacted by the action. A session data structure (or "session" as used herein) is created in response to the action, and includes an action identifier and tile identifier(s) affected by that action. As editing continues, the sessions generated for each action are stored in a LIFO stack (there is one session per action). In response to receiving a request to undo a target session, the methodology is configured to: identify a collateral session that is above the target session in the LIFO stack and that includes a tile identifier that matches the identifier of one or more affected tiles (based on tile identifiers in each session) of the action to be undone. The collateral session includes an identifier of a collateral action. The methodology continues to undo the collateral action, and undo the target action.

Note that not every action in any affected tile must be undone; rather, only the relevant collateral actions are undone. In more detail, and according to an example embodiment, the actions that must be reversed are: the target action identified in the undo request, and any action that affects a tile that is affected by the target action and was executed after the target action (this second type of action is referred to herein as "collateral action"). To further illustrate, consider an example series of three actions that each change a different tile in an image. Action 1 changes tile (1, 2). Action 2 changes tile (2, 2). Action 3 changes tile (3, 1). In this example case, none of three actions is a collateral action because the action of each affects a different tile. Therefore, a user is free to reverse any of the actions directly and without impact on another action. Now consider a new example series of actions. Action 1 draws a horizontal line across 3 tiles. Action 2 draws a vertical line that intersects the horizontal line at the middle tile. In this example, action 2 is a collateral action of action 1. If action 1 is reversed, the state of at least one tile (the middle one) is undefined. So, for instance, it is unclear as to whether the middle tile should include the effect of action 2. Likewise, it is unclear as to whether action 2 changed some property of the middle tile that uses the current state of the middle tile as a starting point. If so, it is unclear as to whether undoing action 1 should change the middle tile (per action 2) based on the state of the tile prior to action 1. As can be seen based on this example scenario, the proper design behavior of an out-of-order undo in this case is not easily understood. So, in accordance with an embodiment, the methodology is configured to undo an action that affects a tile affected by the selected action. These actions are "collateral" actions.

Figure 7:
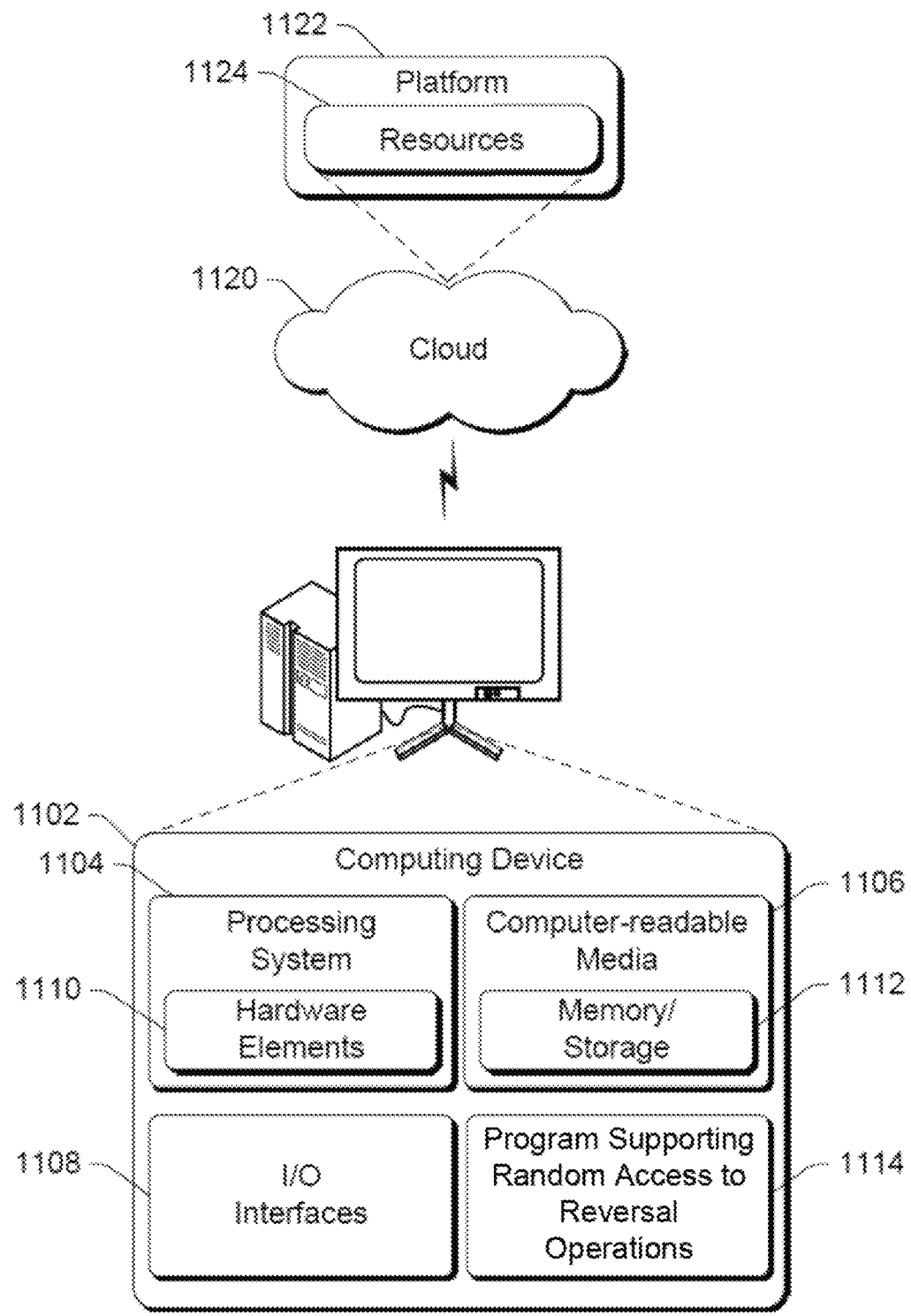
FIG. 7 is a block diagram illustrating an example system that includes an example computing device that is representative of one or more computing systems and/or devices that may implement the various techniques described herein, in accordance with an embodiment of the present disclosure.

FIG. 1 is a block diagram illustrating an example computing device 100 implementing out of order access to reversal operations in accordance with one or more embodiments. The computing device 100 can be any of a variety of different types of devices, such as a desktop computer, a server computer, a laptop or netbook computer, a tablet or notepad computer, a mobile station, an entertainment appliance, a set-top box communicatively coupled to a display device, a television or other display device, a cellular or other wireless phone, a game console, an automotive computer, and so forth. Thus, the computing device 100 may range from a full resource device with substantial memory and processor resources (e.g., personal computers, game consoles) to a low-resource device with limited memory and/or processing resources (e.g., traditional set-top boxes, hand-held game consoles). FIG. 7 below describes yet another example of a device that may serve as the computing device 100 in some embodiments, and will be discussed in turn.

The computing device 100 includes and executes a program 102 and an interface module 104. The interface module 104 provides output to and receives user input from a user of the computing device 100. User input can be provided in a variety of different manners, such as by pressing one or more keys of a keypad or keyboard of the device 100, pressing one or more keys of a controller (e.g., remote control device, mouse, trackpad, etc.) of the device 100, pressing a particular portion of a touchpad or touchscreen of the device 100, selecting one or more elements of an interactive graphical user interface, making a particular gesture on a touchpad or touchscreen of the device 100, and/or making a particular gesture on a controller (e.g., remote control device, mouse, trackpad, etc.) of the device 100. User input can also be provided in other manners, such as via audible inputs to a microphone, via motions of hands or other body parts observed by an image capture device, and so forth.

The program 102 can be any of a variety of different computer programs, such as applications, operating system components, and so forth. In one or more embodiments, the program 102 is an image editing program that allows a user of the computing device to capture, edit, or otherwise manipulate data descriptive of one or more images or drawings. The program 102 can alternatively be other types of programs, such as a video editing program that allows a user of the computing device to capture, edit, or otherwise manipulate data descriptive of video (e.g., multiple image frames). The program 102 allows user input to identify various actions to be executed on the data such as by adding to the data, removing parts of the data, modifying parts of the data, and so forth. In this way, lines or shapes can be added, opacity of images can be increased or decreased, colors can be changed, various other filters can be applied to change the appearance of images, and so forth. The particular actions that can be executed vary based on the particular program 102. In at least one embodiment, the program 102 executes a content editing process, such as the content editing process 200 described further below with reference to FIG. 2.

The program 102 also allows at least some actions to be undone, and at least some actions to be redone. Undoing an action refers to returning information descriptive of an image to which the action was applied to its state prior to the action having been applied. For example, if an action is to change the color of an element within a tile group from blue to green, undoing the action returns the color to blue. Redoing an action refers to executing an undone action again. For example, if an action to change the color of an element within a tile group from blue to green is undone, after the undoing is performed the element is blue. Redoing the action changes the color of the element from blue to green.

The program 102 includes an action logging module 106, an action undo module 108, and an action redo module 110. The action logging module 106 manages the logging or storing of sessions for actions that can be undone in an undo record 112. The action undo module 108 manages the undoing of actions that have been logged or stored in the undo record 112. The action redo module 110 manages the redoing of actions that have been logged or stored in the redo record 114. It is appreciated that while each of the modules 106, 108, and 110 is shown as integrated with the program 102, these modules may also be implemented as one or more separate distinct routines of modules that are in communication with or otherwise accessible by the program 102.

In one or more embodiments, each of the undo record 112 and the redo record 114 is implemented using a data structure referred to as a "modified stack." The modified stack allows sessions to be pushed onto the top of the modified stack and popped off the top of the modified stack, as in a traditional stack. However, the modified stack also allows identified sessions to be percolated to the top of the modified stack and then popped off the top of the modified stack.

Each of the action undo module 108 and the action redo module 110 is configured to execute percolation of identified sessions within their respective modified stacks. Percolating an identified session to the top of the modified stack refers to moving the identified session from its current location in the modified stack to the top of the modified stack in a sequential manner based on user action performed. If an indication of a modified stack within an undo record or a redo record is displayed (e.g., as shown in FIGS. 1 and 5), a visual indication can be provided to show the percolation of the identified session to the top of the undo record (e.g., an animation showing the action in the history list moving to the top of the undo record), in accordance with an embodiment.

Figure 5:
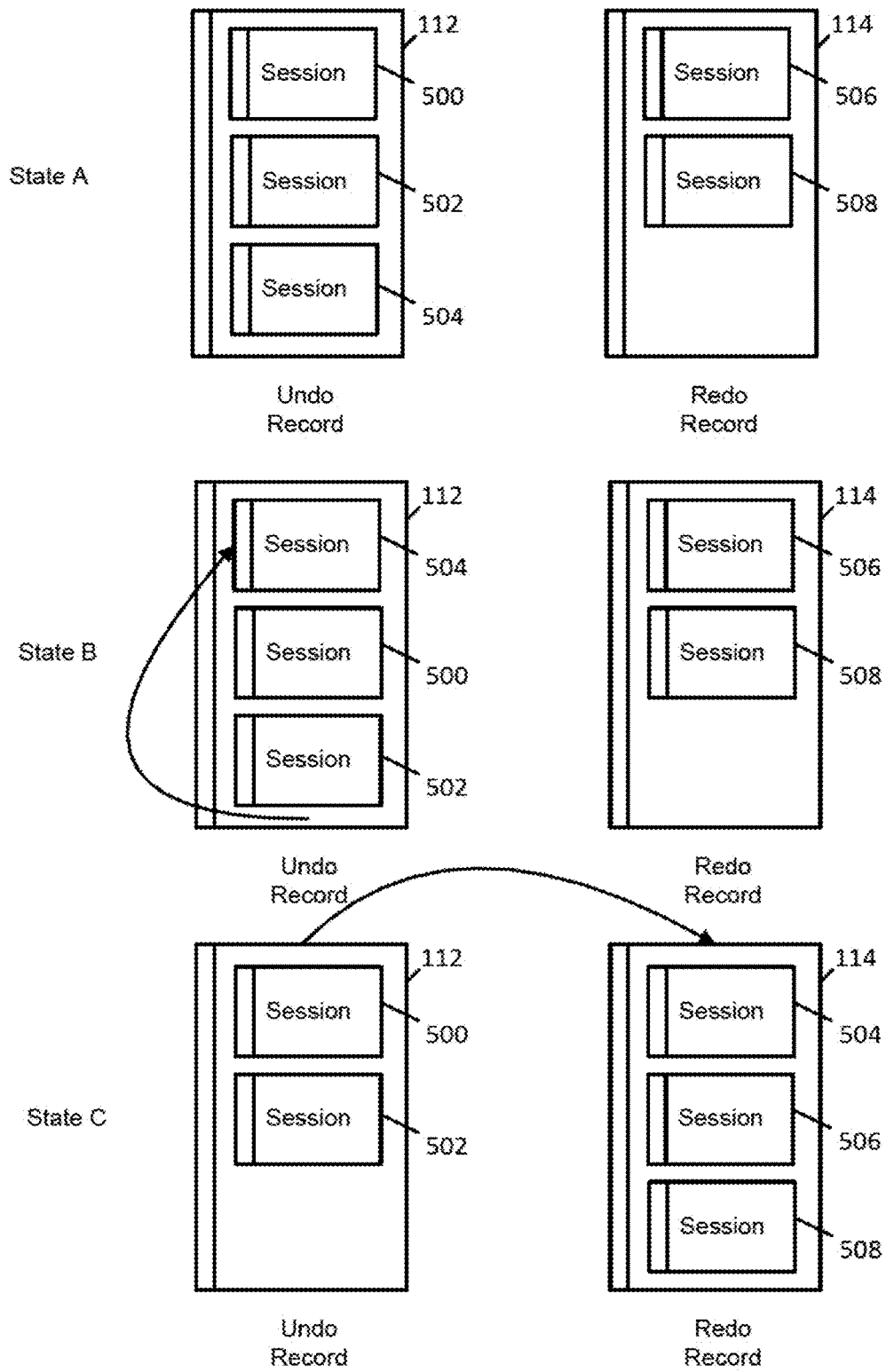
FIG. 5 is a block diagram illustrating three states realized during a percolation executed by a modified stack in accordance with one or more embodiments of the present disclosure.

FIG. 5 illustrates an example of percolating an identified session to the top of an undo record in accordance with one or more embodiments. More specifically, FIG. 5 illustrates the undo record 112 and the redo record 114 within three states: state A, state B, and state C. While in state A, the undo record 112 includes a session 500, a session 502, and a session 504 and the redo record includes a session 506 and a session 508. The sessions 500, 502, and 504 are respectively located at positions 2, 1, and 0 of the modified stack housed within the undo record. The sessions 506 and 508 are respectively located at positions 1 and 0 of the modified stack housed within the redo record 114. When the modified stack executes a percolation operation on an identified session, the modified stack first moves the identified session (e.g., the session 504) to the top of the stack, which results in state B. In some examples, the modified stack next pops the identified session from the undo record 112 and pushes the identified session onto the redo record 114, which results in state C. In some examples, the percolation process ends after the identified session is popped and prior to the identified session being pushed on another stack or modified stack.

Actions are stored in the undo record 112 and the redo record 114 within sessions. Multiple (x) sessions are stored in the undo record 112, and multiple (y) sessions are stored in the redo record 114. Each session in one of the records 112 and 114 includes session information identifying an action performed and image information affected by the action. The image information may include information descriptive of one or more elements of an image (e.g., one or more pixels). The information descriptive of the one or more elements may be grouped within a tile group. For example, according to one embodiment, a session data structure is defined as follows.

```
typedef struct session {
    tile *tile_ptr[MAX_TILES];
    pixel_group *before_version[MAX_TILES];
    pixel_group *after_version[MAX_TILES];
}
```

Session information can indicate that a color was changed from blue to green, and can identify two different elements within a tile group with a color changed (from blue to green) by the action. In another example, the session information can indicate that the opacity was changed from 25% to 35%, and can include an identifier of a single image the opacity of which was changed. It should be noted that in one or more embodiments some actions that are performed are not recorded in a session, and that such actions are ignored by the action undo module 108 and the action redo module 110. For example, a create new document action may not be recorded in a session.

As discussed above, each session identifies an action performed as well as a tile group affected by the action. The session can identify these elements in different manners. In one or more embodiments, the session includes image information descriptive of pixels referred to by the tile group. More particularly, the session includes, a before version of the image information referred to by the tile group (just prior to being acted on) and an after version of the image information referred to by the tile group (just after being acted on). In these embodiments, the identifier of the action is the change in the image information referred to by the tile group (e.g., the change between the before version and the after version). The before version and the after version can be stored in different manners. For example, the session itself in the record 112 or 114 can include the data structures that store the image information of the before version and the after version, or the session in the record 112 or 114 can include a pointer to locations in memory where the image information of the before version and the after version are stored. In some embodiments, the before version and the after version include only image information descriptive of the pixels within the tile group that were affected by the action (i.e., only image information for the pixels that changed between the before version and the after version).

Although an embodiment implementing particular functionality is discussed herein with reference to particular modules, it should be noted that, in other embodiments, the functionality of individual modules discussed herein can be separated into multiple modules, and/or at least some functionality of multiple modules can be combined into a single module. Information may flow between the any of the elements, components, and subsystems described herein, using a variety of techniques. Such techniques include, for example, passing the information over a network using standard protocols, such as TCP/IP or HTTP or HTTPS, passing the information between modules in memory and passing the information by writing to a file, database, data store, or some other nonvolatile data storage device, among others. In addition, pointers or other references to information may be transmitted and received in place of, in combination with, or in addition to, copies of the information. Conversely, the information may be exchanged in place of, in combination with, or in addition to, pointers or other references to the information. Other techniques and protocols for communicating information may be used without departing from the scope of the examples and embodiments disclosed herein.

Figure 2:
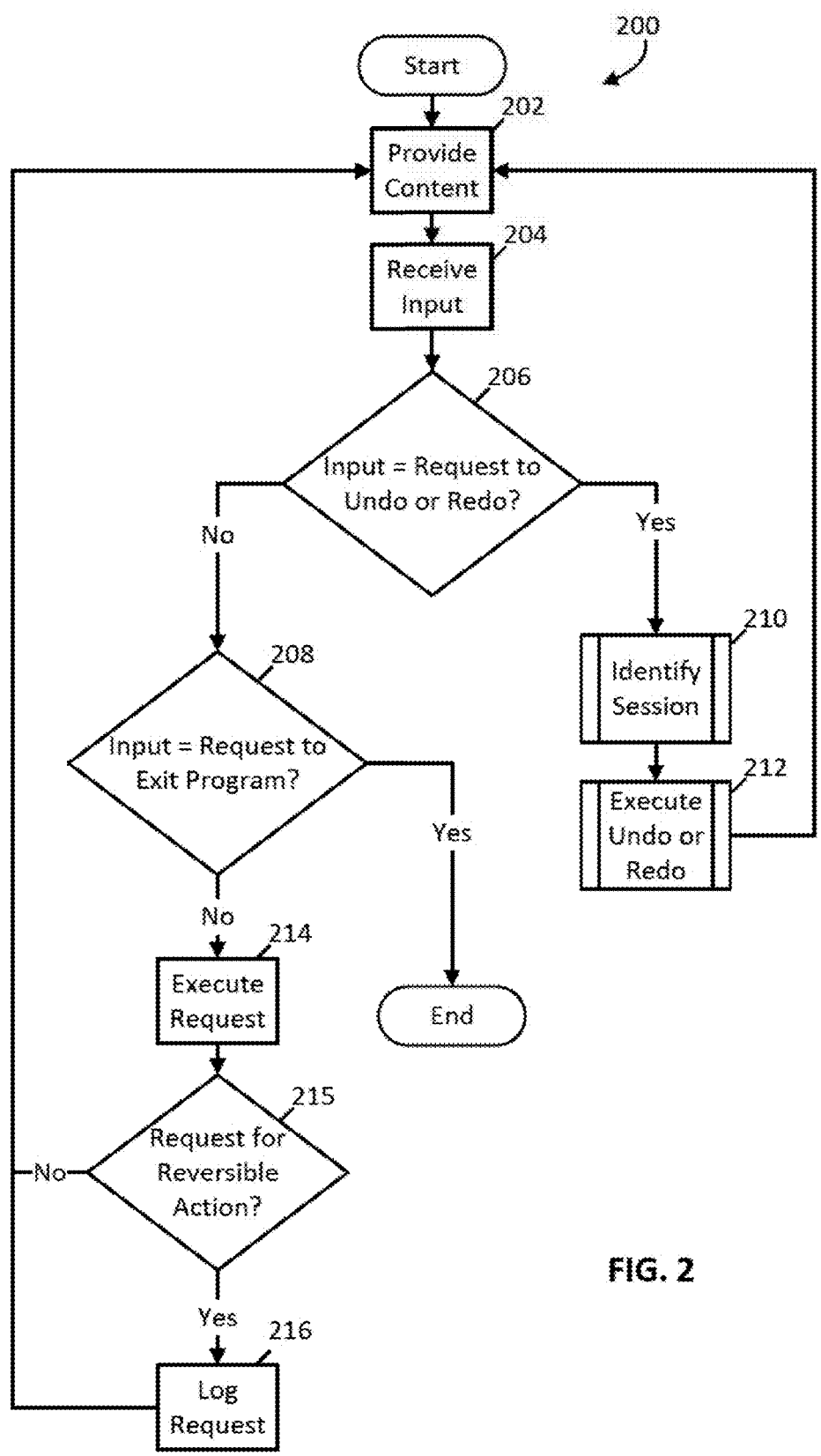
FIG. 2 is a flowchart illustrating an example image content editing process in accordance with one or more embodiments of the present disclosure.

FIG. 2 is a flowchart illustrating an example content editing process 200 that supports out of order access to reversal operations in accordance with one or more embodiments. Content editing process 200 is executed by a device, such as computing device 100 of FIG. 1, and can be implemented in software, firmware, hardware, or combinations thereof. Content editing process 200 is shown as a set of acts and is not limited to the order shown for performing the operations of the various acts. Content editing process 200 is an example process that supports out of order access to reversal operations; additional discussions of supporting out of order access to reversal operations are included herein with reference to different figures.

The content editing process 200 begins at act 202 where the device provides content to a user. This content may include, for example, an image (e.g., the image of FIG. 6 described below). The content may be provided via a user interface, such as the user interface module 104 of FIG. 1. In act 204, the device receives user input via the user interface. The user input may include a request to act upon the content. In act 206, the device determines whether the request references a reversal operation or some other action. If the request references a reversal operation, the device executes act 210. If the request references some other action, the device executes act 208.

In the act 208, the device determines whether the request is a request to exit the program. If the request is a request to exit the program, the device terminates the content editing process 200. If the request is not a request to exit the program, the device executes act 214.

In the act 214, the device executes the action referenced in the request. In act 215, the device determines whether the executed action is a reversible action. If the executed action is a reversible action, the device executes act 216. If the executed action is not reversible, the device executes the act 202.

In the act 216, the device logs the executed action. In some embodiments, the device executes a logging module, such as the action logging module 106, to log the executed action. In these embodiments, where the executed action is a destructive action, the logging module generates a grid of tiles and identifies tiles with pixels affected by the executed action. As referred to herein, a destructive action includes actions stored as changes to pixels. Examples of destructive actions include skewing the image and applying destructive filters (e.g., blur) to the image information. In contrast to destructive actions, examples of non-destructive actions that are not stored as changes to pixels include overlaying text, vectors, or other shapes and changing opacity, masks, and adjustment layers.

Further, within the act 216, the logging module allocates a session data structure, populates fields of the session data structure with identifiers of the executed action and identifiers of image information and tiles affected by the executed action, and stores the session in an undo record. In at least one embodiment, the logging module stores the session in the undo record in a LIFO order by, for example, pushing the session onto a modified stack.

In the act 210, the device identifies a session to reverse, depending on the action requested by the user input. One example of a session identification process 300 executed by the device in the act 210 is described further below with reference to FIG. 3. In act 212, the device executes the reversal operation, again depending on the action requested in the user input. One example of a session reversal process 400 executed by the device in the act 212 is described further below with reference to FIG. 4.

Figure 3:
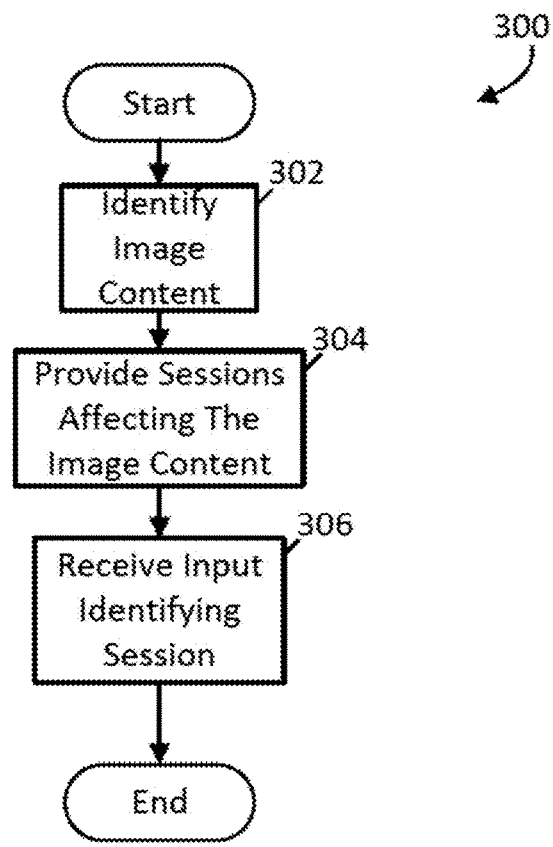
FIG. 3 is a flowchart illustrating an example session identification process in accordance with one or more embodiments of the present disclosure.

FIG. 3 is a flowchart illustrating an example session identification process 300 that supports out of order access to reversal operations in accordance with one or more embodiments. Session identification process 300 is executed by a device, such as computing device 100 of FIG. 1, and can be implemented in software, firmware, hardware, or combinations thereof. Session identification process 300 is shown as a set of acts and is not limited to the order shown for performing the operations of the various acts. Session identification process 300 is an example process that supports out of order access to reversal operations; additional discussions of supporting out of order access to reversal operations are included herein with reference to different figures.

The session identification process 300 begins at act 302 where the device parses the request generated by the user input and identifies a reversal operation (i.e., either an undo operation or a redo operation) and image content specified by information included in the request. In act 304, the device searches a reversal record (i.e., either the undo record or the redo record, as specified by the reversal operation identified in the request) for sessions that reference an action that affects the image content specified in the request. Next, within the act 304, the device provides, to the user via a user interface, an indication of each session identified as referencing an action that affects the image content. For instance, in one embodiment, the device displays a selectable tab for each session. In act 306, the device receives user input identifying a session for reversal, such as by receiving input selecting a tab of the session. Also within the act 306, the device stores information that records the identified session as being the target of the reversal operation, and terminates the session identification process 300. The session identified in the act 306 is referred to herein as the "target session."

Figure 4A:
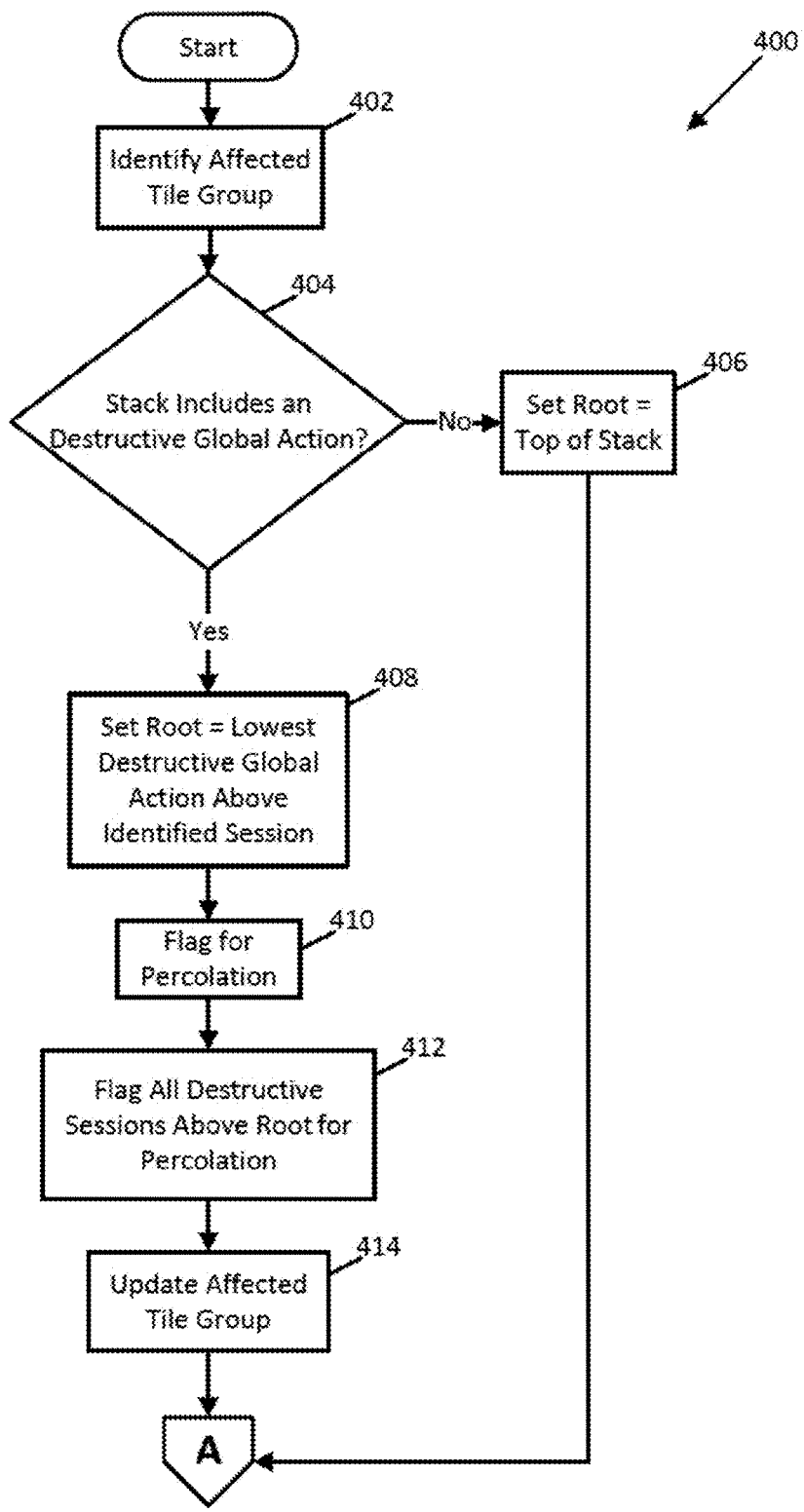
FIGS. 4A and 4B are a flowchart illustrating an example session reversal process in accordance with one or more embodiments of the present disclosure.

FIG. 4 is a flowchart illustrating an example session reversal process 400 that supports out of order access to reversal operations in accordance with one or more embodiments. Session reversal process 400 is executed by a device, such as computing device 100 of FIG. 1, and can be implemented in software, firmware, hardware, or combinations thereof. Session reversal process 400 is shown as a set of acts and is not limited to the order shown for performing the operations of the various acts. Session reversal process 400 is an example process that supports out of order access to reversal operations; additional discussions of supporting out of order access to reversal operations are included herein with reference to different figures. As discussed further below, the session reversal process 400 is directed to reversing changes made by an image editing program, such as some examples of the program 102 described above with reference to FIG. 1.

The session reversal process 400 begins at act 402 where the device identifies a tile group affected by the target session. A tile group may include one or more tiles with pixels affected by an action executed by the image editing program. In one embodiment, the device identifies the tile group simply by accessing identifiers of the tiles stored in the target session. When executing the session reversal process 400, the device uses tiles within the affected tile group to track collateral sessions that must be reversed in addition to the target session (e.g., collateral sessions upon which the target session is dependent).

In act 404, the device determines whether the stack of the reversal record searched in the act 304 above includes a session identifying a global action that changed underlying image information. If so, the identified session and all sessions identifying destructive actions located above the identified session in the modified stack must be reversed. A global action is any action that affects the image as a whole. Global actions stand in contrast to local actions, which affect only identified regions of the image. If the stack of the reversal record includes a destructive global action, the device executes act 408. Otherwise, the device executes act 406.

In the act 406, the device sets a variable (e.g., named "root") to a value that indicates a position at the top of the stack. In the act 408, the device sets the root variable to a value that indicates a position of a root session including a destructive global action that is nearest to and above the target session. The device uses the root variable to mark a position within the stack that serves as a starting point for iterative downward traversals when searching for collateral sessions. This searching process is described further below with reference to FIG. 4B.

In act 410, the device flags the root session for percolation, as described above with reference to FIG. 5. In act 412, the device flags for percolation all sessions including a destructive action that are positioned above the root session, if any such sessions exist. In act 414, the device updates the affected tile group to include all tiles of tile groups identified in sessions flagged for percolation in the act 412.

Figure 4B:
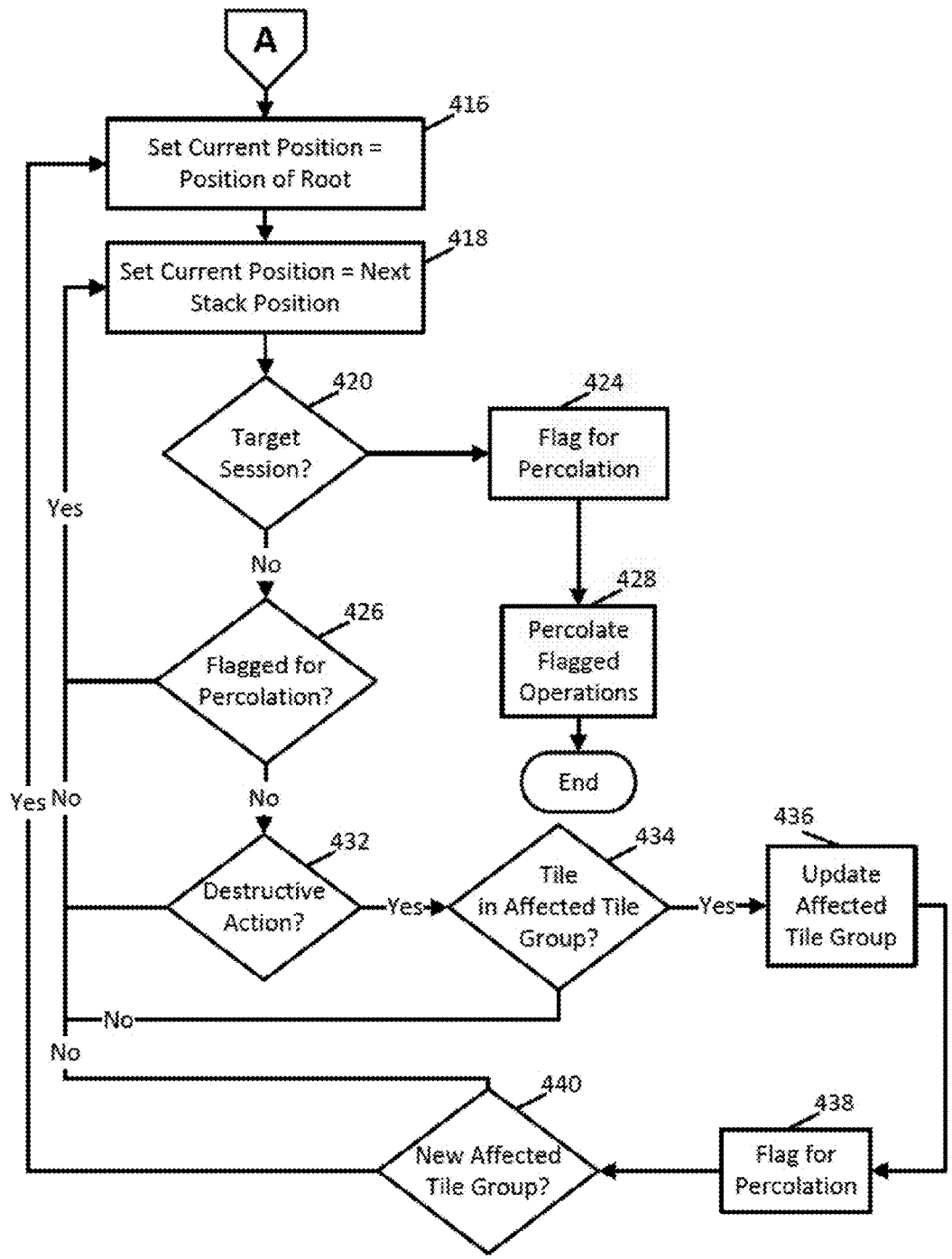

Continuing to FIG. 4B, in act 416, the device sets a variable (e.g., named "current_position") to the value of the root variable. As described further below, the device uses the current_position variable to sequentially identify individual sessions within the stack. More specifically, as referred to herein, the session located within the stack at a position identified by the value of the current_position variable is the "current_position session."

In act 418, the device iterates the value of the current_position variable to the next position in the stack (e.g., increases the value of the current_position variable by 1). The act 418 effects the downward traversal of the modified stack. In act 420, the device determines whether the current_position session is the target session. If so, the device executes act 424. Otherwise, the device executes act 426.

In the act 424, the device flags the current_position session for percolation.

In the act 426, the device determines whether the current_position session is flagged for percolation. If so, no further analysis of the current_position session is necessary, and the device returns to the act 418. Otherwise, the device executes act 432 to further analyze the current_position session. In the act 432, the device determines whether the current_position session identifies a destructive action. If not, no further analysis of the current_position session is necessary as the action may be omitted from percolation, and the device returns to the act 418. Otherwise, the device executes act 434. In the act 434, the device determines whether the current_position session identifies one or more tiles present within the affected tile group. If so, the current_position session should also be percolated, and the device executes act 436. Otherwise, the device returns to act 418.

In act 436, the device updates the affected tile group to include any new tiles identified in the current_position session. In the act 438, the device flags the current_position session for percolation. In act 440, the device determines whether one or more new tiles where added to the affected tile group in the act 436. If so, the device needs to search for collateral sessions identifying actions affecting the one or more new tiles and returns to the act 416. Otherwise, no additional searching is required, and the device returns to the act 418.

In the act 428, the device traverses the stack from the top downward. During the traversal, each session visited that is flagged for percolation is percolated, the action identified in the session is reversed, and the session is pushed onto the stack of another reversal record. So, for example, where a session is percolated from the undo record, it is pushed onto the modified stack in the redo record and where a session is percolated from the redo record, it is pushed onto the modified stack of the undo record. In some embodiments, where the session is percolated from the undo record, the action identified in the session is undone by replacing the currently displayed tile group with the before version of the pixels referred to by the tile group, where the session is percolated from the redo record, the action identified in the session is redone by replacing the currently displayed tile group with the after version of the pixels referred to by the tile group. Responsive to completing this traversal, the device terminates the session reversal process 400.

Processes in accord with the session reversal process 400 enable devices to provide out of order accesses to reversal operations and limit reversal of actions to only those actions required to actually reverse the target session.

Figure 6:
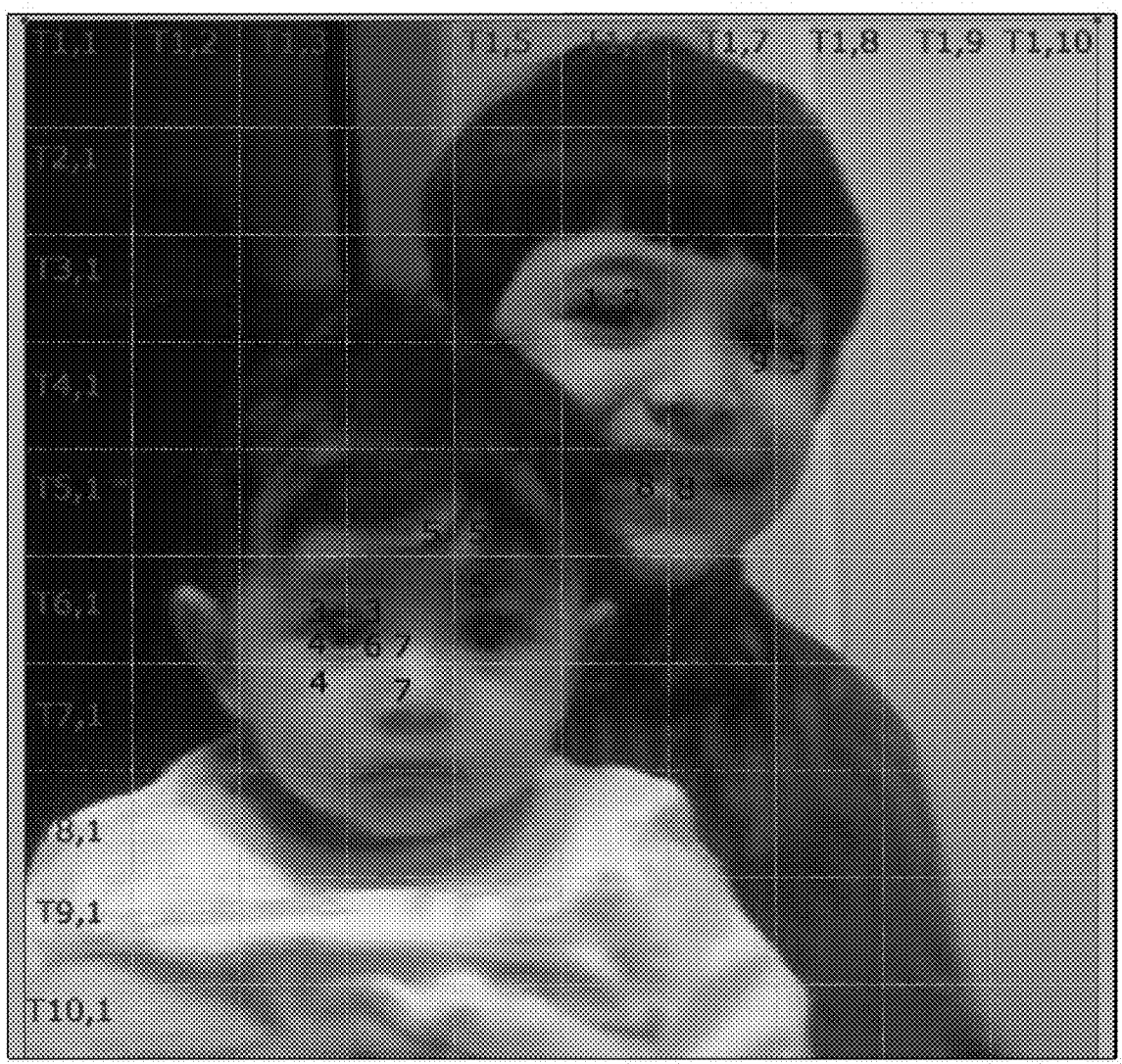
FIG. 6 is a screenshot illustrating example image content decomposed into tiles in accordance with one or more embodiments of the present disclosure.

A particular example of the execution of the processes 200, 300, and 400 will now be described with reference to FIG. 6. FIG. 6 illustrates an image that has been edited through 9 destructive local actions. Each of the tiles affected by the actions includes a number identifying the action. As shown in FIG. 6, some actions (e.g., action 1) affect a tile group including only one tile. Other actions (e.g. action 9) affect a tile group including multiple tiles.

This particular example of the execution of the processes 200, 300, and 400 begins with the act 202 where the device provides the image shown in FIG. 6 to a user. In the act 204, the device receives user input specifying a request to undo a change in tile (6, 3). In the act 206, the device determines that the request is an undo request. In the act 210, the device identifies a session to reverse by executing the session identification process 300.

In the act 302, the device parses the request and identifies the request as an undo request for an action that affected a user-selectable element of image content within the tile (6, 3). In the act 304, the device provides an indication of each session that identifies an action that affected tile (6, 3). In this example, the indications provided to the user include an indication of the session that identifies action 3 and an indication of the session that identifies action 4. In the act 306, the device receives user input selecting the session that identifies action 3, records the session that identifies action 3 as the target session, and returns to the act 212. In the act 212, the device executes the undo operation by executing the session reversal process 400.

In the act 402, the device identifies the affected tile group as including tiles (6, 3) and (6, 4). In act 404, the device determines that the undo stack does not include a destructive global action. In act 406, the device sets the value of the root variable to the top of the stack. In act 416, the device sets the value of the current_position variable equal to the value of the root variable. In the act 418, the device sets the value of the current_position variable equal to the next stack position (i.e., the position of session identifying action 9). In the act 420, the device determines that the current_position session is not the target session. In the act 426, the device determines that the current_position session is not flagged for percolation. In the act 432, the device determines that action 9 is a destructive action. In the act 434, the device determines that none of the tiles identified in the current_position session (i.e., tiles (3, 7); (3, 8); (4, 7); and (4, 8)) is present in the affected tile group (i.e., tiles (6, 3) and (6, 4)) and returns to the act 418.

In the act 418, the device sets the value of the current_position variable equal to the next stack position (i.e., the position of session identifying action 8). In the act 420, the device determines that the current_position session is not the target session. In the act 426, the device determines that the current_position session is not flagged for percolation. In the act 432, the device determines that action 8 is a destructive action. In the act 434, the device determines that none of the tiles identified in the current_position session (i.e., tiles (5, 6) and (5, 7)) is present in the affected tile group (i.e., tiles (6, 3) and (6, 4)) and returns to the act 418.

In the act 418, the device sets the value of the current_position variable equal to the next stack position (i.e., the position of session identifying action 7). In the act 420, the device determines that the current_position session is not the target session. In the act 426, the device determines that the current_position session is not flagged for percolation. In the act 432, the device determines that action 7 is a destructive action. In the act 434, the device determines that a tile identified in the current_position session (i.e., tile (6, 4)) is present in the affected tile group (i.e., tiles (6, 3) and (6, 4)). In the act 436, the device adds tile (7, 4) to the affected tile group because (6, 4) is present in the affected tile group (i.e., tiles (6, 3) and (6, 4)). In the act 438, the device flags the current_position session for percolation. In the act 440, the device determines that tile (7, 4) was added to the affected tile group and returns to the act 416.

In the act 416, the device sets the value of the current_position variable equal to the value of the root variable. In the act 418, the device sets the value of the current_position variable equal to the next stack position (i.e., the position of session identifying action 9). In the act 420, the device determines that the current_position session is not the target session. In the act 426, the device determines that the current_position session is not flagged for percolation. In the act 432, the device determines that action 9 is a destructive action. In the act 434, the device determines that none of the tiles identified in the current_position session (i.e., tiles (3, 7); (3, 8); (4, 7); and (4, 8)) is present in the affected tile group (i.e., tiles (6, 3); (6, 4); and (7, 4)) and returns to the act 418.

In the act 418, the device sets the value of the current_position variable equal to the next stack position (i.e., the position of session identifying action 8). In the act 420, the device determines that the current_position session is not the target session. In the act 426, the device determines that the current_position session is not flagged for percolation. In the act 432, the device determines that action 8 is a destructive action. In the act 434, the device determines that none of the tiles identified in the current_position session (i.e., tiles (5, 6) and (5, 7)) is present in the affected tile group (i.e., tiles (6, 3); (6, 4); and (7, 4)) and returns to the act 418.

In the act 418, the device sets the value of the current_position variable equal to the next stack position (i.e., the position of session identifying action 7). In the act 420, the device determines that the current_position session is not the target session. In the act 426, the device determines that the current_position session is flagged for percolation and returns to the act 418.

In the act 418, the device sets the value of the current_position variable equal to the next stack position (i.e., the position of session identifying action 6). In the act 420, the device determines that the current_position session is not the target session. In the act 426, the device determines that the current_position session is not flagged for percolation. In the act 432, the device determines that action 6 is a destructive action. In the act 434, the device determines that a tile identified in the current_position session (i.e., tile (6, 3)) is present in the affected tile group (i.e., tiles (6, 3); (6, 4); and (7, 4)). In the act 436, the device adds no tiles to the affected tile group because (6, 3) is already present in the affected tile group (i.e., tiles (6, 3); (6, 4); and (7, 4)). In the act 438, the device flags the current_position session for percolation. In the act 440, the device determines that no tiles were added to the affected tile group and returns to the act 418.

In the act 418, the device sets the value of the current-_position variable equal to the next stack position (i.e., the position of session identifying action 5). In the act 420, the device determines that the current_position session is not the target session. In the act 426, the device determines that the current_position session is not flagged for percolation. In the act 432, the device determines that action 5 is a destructive action. In the act 434, the device determines that none of the tiles identified in the current_position session (i.e., tiles (5, 4); (5, 5); and (6, 5)) is present in the affected tile group (i.e., tiles (6, 3); (6, 4); and (7, 4)) and returns to the act 418.

In the act 418, the device sets the value of the current_position variable equal to the next stack position (i.e., the position of session identifying action 4). In the act 420, the device determines that the current_position session is not the target session. In the act 426, the device determines that the current_position session is not flagged for percolation. In the act 432, the device determines that action 4 is a destructive action. In the act 434, the device determines that a tile identified in the current_position session (i.e., tile (6, 3)) is present in the affected tile group (i.e., tiles (6, 3); (6, 4); and (7, 4)). In the act 436, the device adds tile (7, 3) to the affected tile group because (6, 3) is present in the affected tile group (i.e., tiles (6, 3); (6, 4); and (7, 4)). In the act 438, the device flags the current_position session for percolation.

In the act 440, the device determines that tile (7, 3) was added to the affected tile group and returns to the act 416.

In the act 416, the device sets the value of the current_position variable equal to the value of the root variable. In the act 418, the device sets the value of the current_position variable equal to the next stack position (i.e., the position of session identifying action 9). In the act 420, the device determines that the current_position session is not the target session. In the act 426, the device determines that the current_position session is not flagged for percolation. In the act 432, the device determines that action 9 is a destructive action. In the act 434, the device determines that none of the tiles identified in the current_position session (i.e., tiles (3, 7); (3, 8); (4, 7); and (4, 8)) is present in the affected tile group (i.e., tiles (6, 3); (6, 4); (7, 4) and (7, 3)) and returns to the act 418.

In the act 418, the device sets the value of the current_position variable equal to the next stack position (i.e., the position of session identifying action 8). In the act 420, the device determines that the current_position session is not the target session. In the act 426, the device determines that the current_position session is not flagged for percolation. In the act 432, the device determines that action 8 is a destructive action. In the act 434, the device determines that none of the tiles identified in the current_position session (i.e., tiles (5, 6) and (5, 7)) is present in the affected tile group (i.e., tiles (6, 3); (6, 4); (7, 4) and (7, 3)) and returns to the act 418.

In the act 418, the device sets the value of the current_position variable equal to the next stack position (i.e., the position of session identifying action 7). In the act 420, the device determines that the current_position session is not the target session. In the act 426, the device determines that the current_position session is flagged for percolation and returns to the act 418.

In the act 418, the device sets the value of the current_position variable equal to the next stack position (i.e., the position of session identifying action 6). In the act 420, the device determines that the current_position session is not the target session. In the act 426, the device determines that the current_position session is flagged for percolation and returns to the act 418.

In the act 418, the device sets the value of the current_position variable equal to the next stack position (i.e., the position of session identifying action 5). In the act 420, the device determines that the current_position session is not the target session. In the act 426, the device determines that the current_position session is not flagged for percolation. In the act 432, the device determines that action 5 is a destructive action. In the act 434, the device determines that none of the tiles identified in the current_position session (i.e., tiles (5, 4); (5, 5); and (6, 5)) is present in the affected tile group (i.e., tiles (6, 3); (6, 4); (7, 4) and (7, 3)) and returns to the act 418.

In the act 418, the device sets the value of the current_position variable equal to the next stack position (i.e., the position of session identifying action 4). In the act 420, the device determines that the current_position session is not the target session. In the act 426, the device determines that the current_position session is flagged for percolation and returns to the act 418.

In the act 418, the device sets the value of the current_position variable equal to the next stack position (i.e., the position of session identifying action 3). In the act 420, the device determines that the current_position session is the target session. In the act 424, the device flags the current_position session for percolation. In the act 428, the device percolates the sessions identifying actions 7, 6, 4, and 3 and terminates the session reversal process 400, thereby returning to the content editing process 200.

It is appreciated that in the example described above, the device limits the effect of a reversal operation to original tiles that are affected by the action targeted for reversal or collateral tiles that are affected by an action that also affects an original tile. Thus, actions to tiles (6, 3); (6, 4); (7, 3); and (7, 4) are reversed, but actions to the remainder of the tiles are left in place.

Another example execution of the session reversal process 400 will now be discussed with reference to Table 1.

TABLE 1

13. Lp - 8
12. Gr
11. Lr - 1
10. Gp
9. Lp - 2, 3, 7
8. Gp
7. Lp - 7, 1
6. Lp - 9
5. Lr - 1, 2, 3, 4, 5, 6, 7
4. Lp - 5
3. Lp - 6, 5
2. LO - 2, 3, 6
1. Gp
0. Lp - 3

Table 1 lists 14 sessions (i.e., 13 to 0) included in a modified stack allocated within a reversal record. Each session includes session information describing an action and a tile group affected by the action. The first letter of session information (i.e., an "L" or a "G") identifies whether the action is a local action or a global action. The second letter (i.e., an "r" or a "p") identifies whether the action is a non-destructive action ("r") or a destructive action ("p"). The numbers listed within each session identify members (e.g., tiles) of the tile group affected by the action. In this example, the tiles are 1-dimensional. Session 2 is the target session.

This particular example begins with the act 402 in which the device identifies the affected tile group as {2, 3, 6}. In the act 404, the device determines that the stack includes a session that identifies a destructive global action (e.g., session 10, session 8, and session 1). In the act 408, the device sets the value of the root variable to 8. In the act 410, the device flags session 8 for percolation. In the act 412, the device flags sessions 13, 10, and 9 for percolation. In the act 414, the device adds tiles 8 and 7 to the affected tile group.

In the act 416, the device sets the value of the current_position variable equal to the value of the root variable. In the act 418, the device sets the value of the current_position variable equal to the next stack position (i.e., the position of session 7). In the act 420, the device determines that the current_position session is not the target session. In the act 426, the device determines that the current_position session is not flagged for percolation. In the act 432, the device determines that the action identified in the current_position session is a destructive action. In the act 434, the device determines that a tile identified in the current_position session (i.e., tile 7) is present in the affected tile group (i.e., tiles 2, 3, 6, 8, and 7). In the act 436, the device adds tile 1 to the affected tile group because tile 7 is present in the affected tile group. In the act 438, the device flags the current_position session for percolation. In the act 440, the device determines that tile 1 was added to the affected tile group and returns to the act 416.

In the act 416, the device sets the value of the current_position variable equal to the value of the root variable. In the act 418, the device sets the value of the current_position variable equal to the next stack position (i.e., the position of session 7). In the act 420, the device determines that the current_position session is not the target session. In the act 426, the device determines that the current_position session is flagged for percolation and returns to the act 418.

In the act 418, the device sets the value of the current_position variable equal to the next stack position (i.e., the position of session 6). In the act 420, the device determines that the current_position session is not the target session. In the act 426, the device determines that the current_position session is not flagged for percolation. In the act 432, the device determines that the action identified in the current_position session is a destructive action. In the act 434, the device determines that none of the tiles identified in the current_position session (i.e., tile 9) is present in the affected tile group (i.e., tiles 2, 3, 6, 8, 7, 1) and returns to the act 418.

In the act 418, the device sets the value of the current_position variable equal to the next stack position (i.e., the position of session 5). In the act 420, the device determines that the current_position session is not the target session. In the act 426, the device determines that the current_position session is not flagged for percolation. In the act 432, the device determines that the action identified in the current_position session is not a destructive action and returns to the act 418.

In the act 418, the device sets the value of the current_position variable equal to the next stack position (i.e., the position of session 4). In the act 420, the device determines that the current_position session is not the target session. In the act 426, the device determines that the current_position session is not flagged for percolation. In the act 432, the device determines that the action identified in the current_position session is a destructive action. In the act 434, the device determines that a tile identified in the current_position session (i.e., tile 6) is present in the affected tile group (i.e., tiles 2, 3, 6, 8, 7, 1). In the act 436, the device adds tile 5 to the affected tile group because tile 6 is present in the affected tile group. In the act 438, the device flags the current_position session for percolation. In the act 440, the device determines that tile 5 was added to the affected tile group and returns to the act 416.

In the act 416, the device sets the value of the current_position variable equal to the value of the root variable. In the act 418, the device sets the value of the current_position variable equal to the next stack position (i.e., the position of session 7). In the act 420, the device determines that the current_position session is not the target session. In the act 426, the device determines that the current_position session is flagged for percolation and returns to the act 418.

In the act 418, the device sets the value of the current_position variable equal to the next stack position (i.e., the position of session 6). In the act 420, the device determines that the current_position session is not the target session. In the act 426, the device determines that the current_position session is not flagged for percolation. In the act 432, the device determines that the action identified in the current_position session is a destructive action. In the act 434, the device determines that none of the tiles identified in the current_position session (i.e., tile 9) is present in the affected tile group (i.e., tiles 2, 3, 6, 8, 7, 1, 5) and returns to the act 418.

In the act 418, the device sets the value of the current_position variable equal to the next stack position (i.e., the position of session 5). In the act 420, the device determines that the current_position session is not the target session. In the act 426, the device determines that the current_position session is not flagged for percolation. In the act 432, the device determines that the action identified in the current_position session is not a destructive action and returns to the act 418.

In the act 418, the device sets the value of the current_position variable equal to the next stack position (i.e., the position of session 4). In the act 420, the device determines that the current_position session is not the target session. In the act 426, the device determines that the current_position session is not flagged for percolation. In the act 432, the device determines that the action identified in the current_position session is a destructive action. In the act 434, the device determines that a tile identified in the current_position session (i.e., tile 5) is present in the affected tile group (i.e., tiles 2, 3, 6, 8, 7, 1, 5). In the act 436, the device adds no tiles to the affected tile group because tile 5 is already present in the affected tile group. In the act 438, the device flags the current_position session for percolation. In the act 440, the device determines that no tiles were added to the affected tile group and returns to the act 418.

In the act 418, the device sets the value of the current_position variable equal to the next stack position (i.e., the position of session 3). In the act 420, the device determines that the current_position session is not the target session. In the act 426, the device determines that the current_position session is not flagged for percolation. In the act 432, the device determines that the action identified in the current_position session is a destructive action. In the act 434, the device determines that a tile identified in the current_position session (i.e., tile 5 or tile 6) is present in the affected tile group (i.e., tiles 2, 3, 6, 8, 7, 1, 5). In the act 436, the device adds no tiles to the affected tile group because tile 5 and tile 6 are already present in the affected tile group. In the act 438, the device flags the current_position session for percolation. In the act 440, the device determines that no tiles were added to the affected tile group and returns to the act 418.

In the act 418, the device sets the value of the current_position variable equal to the next stack position (i.e., the position of session 2). In the act 420, the device determines that the current_position session is the target session. In the act 424, the device flags the current_position session for percolation. In the act 428, the device percolates the sessions 13, 10, 9, 8, 7, 4, 3, and 2 and terminates the session reversal process 400.

FIG. 7 illustrates an example system generally at 1100 that includes an example computing device 1102 that is representative of one or more computing systems and/or devices that may implement the various techniques described herein. This is illustrated through inclusion of a program 1114 that supports out of order access to reversal operations, which may be configured to implement the techniques discussed herein. The computing device 1102 may be, for example, a server of a service provider, a device associated with a client (e.g., a client device), an on-chip system, and/or any other suitable computing device or computing system.

The example computing device 1102 as illustrated includes a processing system 1104, one or more computer-readable media 1106, and one or more I/O interfaces 1108 that are communicatively coupled, one to another. Although not shown, the computing device 1102 may further include a system bus or other data and command transfer system that couples the various components, one to another. A system bus can include any one or combination of different bus structures, such as a memory bus or memory controller, a peripheral bus, a universal serial bus, and/or a processor or local bus that utilizes any of a variety of bus architectures. A variety of other examples are also contemplated, such as control and data lines.

The processing system 1104 is representative of functionality to perform one or more operations using hardware. Accordingly, the processing system 1104 is illustrated as including hardware elements 1110 that may be configured as processors, functional blocks, and so forth. This may include implementation in hardware as an application specific integrated circuit or other logic device formed using one or more semiconductors. The hardware elements 1110 are not limited by the materials from which they are formed or the processing mechanisms employed therein. For example, processors may be comprised of semiconductor(s) and/or transistors (e.g., electronic integrated circuits (ICs)). In such a context, processor-executable instructions may be electronically-executable instructions.

The computer-readable storage media 1106 is illustrated as including memory/storage 1112. The memory/storage 1112 represents memory/storage capacity associated with one or more computer-readable media. The memory/storage component 1112 may include volatile media (such as random access memory (RAM)) and/or nonvolatile media (such as read only memory (ROM), Flash memory, optical disks, magnetic disks, and so forth). The memory/storage component 1112 may include fixed media (e.g., RAM, ROM, a fixed hard drive, and so on) as well as removable media (e.g., Flash memory, a removable hard drive, an optical disc, and so forth). The computer-readable media 1106 may be configured in a variety of other ways as further described below.

The input/output interface(s) 1108 are representative of functionality to allow a user to enter commands and information to the computing device 1102, and also allow information to be presented to the user and/or other components or devices using various input/output devices. Examples of input devices include a keyboard, a cursor control device (e.g., a mouse), a microphone, a scanner, touch functionality (e.g., capacitive or other sensors that are configured to detect physical touch), a camera (e.g., which may employ visible or non-visible wavelengths such as infrared frequencies to recognize movement as gestures that do not involve touch), and so forth. Examples of output devices include a display device (e.g., a monitor or projector), speakers, a printer, a network card, tactile-response device, and so forth. Thus, the computing device 1102 may be configured in a variety of ways as further described below to support user interaction.

Various techniques may be described herein in the general context of software, hardware elements, or program modules. Generally, such modules include routines, programs, objects, elements, components, data structures, and so forth that perform particular tasks or implement particular data types. The terms "module," "functionality," and "component" as used herein generally represent software, firmware, hardware, or a combination thereof. The features of the techniques described herein are platform-independent, meaning that the techniques may be implemented on a variety of computing platforms having a variety of processors.

An implementation of the described modules and techniques may be stored on or transmitted across some form of computer-readable media. The computer-readable media may include a variety of media that may be accessed by the computing device 1102. By way of example, and not limitation, computer-readable media may include "computer-readable storage media" and "computer-readable signal media."

"Computer-readable storage media" refer to media and/or devices that enable persistent and/or non-transitory storage of information in contrast to mere signal transmission, carrier waves, or signals per se. Thus, computer-readable storage media refers to non-signal bearing media. The computer-readable storage media includes hardware such as volatile and nonvolatile, removable and non-removable media and/or storage devices implemented in a method or technology suitable for storage of information such as computer readable instructions, data structures, program modules, logic elements/circuits, or other data. Examples of computer-readable storage media may include, but are not limited to, RAM, ROM, EEPROM, flash memory or other memory technology, CD-ROM, digital versatile disks (DVD) or other optical storage, hard disks, magnetic cassettes, magnetic tape, magnetic disk storage or other magnetic storage devices, or other storage device, tangible media, or article of manufacture suitable to store the desired information and which may be accessed by a computer.

"Computer-readable signal media" may refer to a signal-bearing medium that is configured to transmit instructions to the hardware of the computing device 1102, such as via a network. Signal media typically may embody computer readable instructions, data structures, program modules, or other data in a modulated data signal, such as carrier waves, data signals, or other transport mechanism. Signal media also include any information delivery media. The term "modulated data signal" means a signal that has one or more of its characteristics set or changed in such a manner as to encode information in the signal. By way of example, and not limitation, communication media include wired media such as a wired network or direct-wired connection, and wireless media such as acoustic, RF, infrared, and other wireless media.

As previously described, the hardware elements 1110 and the computer-readable media 1106 are representative of modules, programmable device logic and/or fixed device logic implemented in a hardware form that may be employed in some embodiments to implement at least some aspects of the techniques described herein, such as to perform one or more instructions. Hardware may include components of an integrated circuit or on-chip system, an application-specific integrated circuit (ASIC), a field-programmable gate array (FPGA), a complex programmable logic device (CPLD), and other implementations in silicon or other hardware. In this context, hardware may operate as a processing device that performs program tasks defined by instructions and/or logic embodied by the hardware as well as a hardware utilized to store instructions for execution, e.g., the computer-readable storage media described previously.

Combinations of the foregoing may also be employed to implement various techniques described herein. Accordingly, software, hardware, or executable modules may be implemented as one or more instructions and/or logic embodied on some form of computer-readable storage media and/or by the one or more hardware elements 1110. The computing device 1102 may be configured to implement particular instructions and/or functions corresponding to the software and/or hardware modules. Accordingly, implementation of a module that is executable by the computing device 1102 as software may be achieved at least partially in hardware, e.g., through use of computer-readable storage media and/or the hardware elements 1110 of the processing system 1104. The instructions and/or functions may be executable/operable by one or more articles of manufacture (for example, the one or more computing devices 1102 and/or the processing systems 1104) to implement techniques, modules, and examples described herein.

The techniques described herein may be supported by various configurations of the computing device 1102 and are not limited to the specific examples of the techniques described herein. This functionality may also be implemented all or in part through use of a distributed system, such as over a "cloud" 1120 via a platform 1122 as described below.

The cloud 1120 includes and/or is representative of the platform 1122 for the resources 1124. The platform 1122 provides access to underlying functionality of hardware (e.g., servers) and software resources of the cloud 1120. The resources 1124 may include applications and/or data that can be utilized while computer processing is executed on servers that are remote from the computing device 1102. The resources 1124 can also include services provided over the Internet and/or through a subscriber network, such as a cellular or Wi-Fi network.

The platform 1122 may provide resources and functions to connect the computing device 1102 with other computing devices. The platform 1122 may also scale resources to provide a corresponding level of scale to encountered demand for the resources 1124 that are implemented via the platform 1122. Accordingly, in an interconnected device embodiment, implementation of functionality described herein may be the distributed throughout system 1100. For example, the functionality may be implemented in part on the computing device 1102 as well as via the platform 1122 that provides the functionality of the cloud 1120.

Further Example Embodiments

According to one embodiment, a computing device is provided. The computing device includes a memory, at least one processor coupled to the memory, an interface module executable by the processor, an action logging module executable by the processor, and an action undo module executable by the processor. The memory stores an undo record including a first stack. The interface module is configured to provide image content to a user and to receive user input including a request for one or more actions to be executed on information descriptive of the image content. The action logging module is configured to store, within the first stack, one or more sessions descriptive of the one or more actions. Each session of the one or more sessions includes at least one identifier of at least one tile that is affected by a respective action of the one or more actions. The action undo module is configured to receive user input requesting a target session of the one or more sessions be undone. The target session includes an identifier of a target action and an identifier of one or more affected tiles. The action undo module is also configured to identify a collateral session of the one or more sessions that is above the target session in the first stack and that includes at least one identifier of at least one tile of the one or more affected tiles.

The collateral session includes an identifier of a collateral action. In this embodiment, the target session is lower in the first stack than the collateral session. Also, in this embodiment, the action undo module is configured to undo the collateral action and undo the target action.

In the computing device, the collateral session may include an identifier of an action that affected an additional tile other than any of the one or more tiles. The first stack may include a modified stack. The action undo module may be further configured to execute percolation of the target session. The action undo module may be further configured to determine that the collateral session includes an identifier of a non-destructive action and omit percolation of the collateral session. The action undo module may be further configured to determine that the collateral session includes an identifier of a destructive action and execute percolation of the collateral session prior to percolation of the target session. The action undo module may be further configured to identify a global session including an identifier of a destructive global action, the global session being above the target session in the first stack and below any other sessions in the first stack that identify other destructive global actions; flag, for percolation, the global session; and flag, for percolation, all sessions in the first stack that are above the global session and that include identifiers of destructive actions. The action undo module may be further configured to flag, for percolation, each session above the global session in the first stack that includes at least one identifier of at least one tile of the one or more affected tiles.

In the computing device, the memory may store a redo record including a second stack and the action undo module may be further configured to pop the collateral session from the first stack, push the collateral onto the second stack, pop the target session from the first stack, and push the target session onto the second stack. The computing device may further include a redo module executable by the at least one processor. The redo module may be configured to receive user input requesting the collateral session be redone, redo the target action, pop the target session from the second stack, push the target session onto the first stack, redo the collateral action, pop the collateral session from the second stack, and push the collateral onto the first stack.

According to another embodiment a method implemented using a computing device is provided. The computing device includes memory and at least one processor. The method comprises acts of providing image content to a user; receiving user input requesting one or more actions be executed on information descriptive of the image content; allocating an undo record in the memory; allocating a first stack in the undo record; storing, within the first stack, one or more sessions descriptive of the one or more actions, each session of the one or more sessions including at least one identifier of at least one tile that is affected by a respective action of the one or more actions; receiving user input requesting a target session of the one or more sessions be undone, the target session identifying a target action having affected one or more tiles; identifying a collateral session of the one or more sessions that is above the target session in the first stack and that includes an identifier of a collateral action and at least one identifier of at least one tile of the one or more affected tiles; undoing the collateral action; and undoing the target action.

In the method, the act of allocating the first stack may include an act of allocating a modified stack. The method may further include an act of executing percolation of the target session. The method may further include acts of determining that the collateral session describes a non-destructive action and omitting percolation of the collateral session. The method may further include acts of determining that the collateral session describes a destructive action and executing percolation of the collateral session prior to percolation of the target session. The method may further include acts of identifying a global session including an identifier of a destructive global action, the global session being above the target session in the first stack and below any other sessions in the first stack that identify other destructive global actions; flagging, for percolation, the global session; and flagging, for percolation, all sessions in the first stack that are above the global session and that include identifiers of destructive actions.

The method may further include an act of flagging, for percolation, each session above the global session in the first stack that includes at least one identifier of at least one tile of the one or more affected tiles. The method may further include acts of allocating an redo record in the memory; allocating a second stack in the redo record; popping the collateral session from the first stack; pushing the collateral session onto the second stack; popping the target session from the first stack; and pushing the target session onto the second stack. The method may further include acts of receiving user input requesting the collateral session be redone; redoing the target action; popping the target session from the second stack; pushing the target session onto the first stack; redoing the collateral action; popping the collateral session from the second stack; and pushing the collateral session onto the first stack.

According to another embodiment, a non-transitory computer readable medium is provided. The computer readable medium stores computer executable instructions configured to instruct at least one processor to execute a method for providing out of order access to reversal operations. The method includes providing image content to a user; receiving user input requesting one or more actions be executed on information descriptive of the image content; allocating an undo record in the memory; allocating a stack in the undo record; storing, within the stack, one or more sessions descriptive of the one or more actions, each session of the one or more sessions including at least one identifier of at least one tile that is affected by a respective action of the one or more actions; receiving user input requesting a target session of the one or more sessions be undone, the target session identifying a target action having affected one or more tiles; identifying a collateral session of the one or more sessions that is above the target session in the first stack and that includes an identifier of a collateral action and at least one identifier of at least one tile of the one or more affected tiles; undoing the collateral action; and undoing the target action.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. A computing device comprising:
   memory storing an undo record including a first stack;
   at least one processor coupled to the memory;
   an interface module executable by the at least one processor and configured to:
      provide image content to a user; and
      receive user input including a request for one or more actions to be executed on information descriptive of the image content;
   an action logging module executable by the at least one processor and configured to store, within the first stack, one or more sessions descriptive of the one or more actions, each session of the one or more sessions including at least one identifier of at least one tile that is affected by a respective action of the one or more actions, the at least one tile being associated with the image content; and
   an action undo module executable by the at least one processor and configured to:
      receive user input requesting a target session of the one or more sessions be undone, the target session including an identifier of a target action and an identifier of one or more affected tiles, the one or more affected tiles being associated with the image content;
      identify a collateral session of the one or more sessions that is above the target session in the first stack and that includes at least one identifier of at least one tile of the one or more affected tiles, the collateral session including an identifier of a collateral action;
      undo the collateral action; and
      undo the target action.

2. The computing device of claim 1, wherein the collateral session includes an identifier of an action that affected an additional tile other than any of the one or more affected tiles.

3. The computing device of claim 1, wherein the first stack includes a modified stack.

4. The computing device of claim 3, wherein the action undo module is further configured to execute percolation of the target session.

5. The computing device of claim 4, wherein the action undo module is further configured to:
   determine that the collateral session includes an identifier of a non-destructive action; and
   omit percolation of the collateral session.

6. The computing device of claim 4, wherein the action undo module is further configured to:
   determine that the collateral session includes an identifier of a destructive action; and
   execute percolation of the collateral session prior to percolation of the target session.

7. The computing device of claim 1, wherein the action undo module is further configured to:
   identify a global session including an identifier of a destructive global action, the global session being above the target session in the first stack and below any other sessions in the first stack that identify other destructive global actions;
   flag, for percolation, the global session; and
   flag, for percolation, all sessions in the first stack that are above the global session and that include identifiers of destructive actions.

8. The computing device of claim 7, wherein the action undo module is further configured to flag, for percolation, each session above the global session in the first stack that includes at least one identifier of at least one tile of the one or more affected tiles.

9. The computing device of claim 1, wherein the memory stores a redo record including a second stack and the action undo module is further configured to:
   pop the collateral session from the first stack;
   push the collateral onto the second stack;
   pop the target session from the first stack; and
   push the target session onto the second stack.

10. The computing device of claim 9, further comprising a redo module executable by the at least one processor and configured to:

receive user input requesting the collateral session be redone;
redo the target action;
pop the target session from the second stack;
push the target session onto the first stack;
redo the collateral action;
pop the collateral session from the second stack; and
push the collateral onto the first stack.

11. A method implemented using a computing device including memory and at least one processor, the method comprising:
proving image content to a user;
receiving user input requesting one or more actions be executed on information descriptive of the image content;
allocating an undo record in the memory;
allocating a first stack in the undo record;
storing, within the first stack, one or more sessions descriptive of the one or more actions, each session of the one or more sessions including at least one identifier of at least one tile that is affected by a respective action of the one or more actions, the at least one tile being associated with the image content;
receiving user input requesting a target session of the one or more sessions be undone, the target session identifying a target action having affected one or more tiles, the one or more affected tiles being associated with the image content;
identifying a collateral session of the one or more sessions that is above the target session in the first stack and that includes an identifier of a collateral action and at least one identifier of at least one tile of the one or more affected tiles;
undoing the collateral action; and
undoing the target action.

12. The method of claim 11, wherein allocating the first stack includes allocating a modified stack.

13. The method of claim 12, further comprising executing percolation of the target session.

14. The method of claim 13, further comprising:
determining that the collateral session describes a non-destructive action; and
omitting percolation of the collateral session.

15. The method of claim 13, further comprising:
determining that the collateral session describes a destructive action; and
executing percolation of the collateral session prior to percolation of the target session.

16. The method of claim 11, further comprising:
identifying a global session including an identifier of a destructive global action, the global session being above the target session in the first stack and below any other sessions in the first stack that identify other destructive global actions;
flagging, for percolation, the global session; and
flagging, for percolation, all sessions in the first stack that are above the global session and that include identifiers of destructive actions.

17. The method of claim 16, further comprising flagging, for percolation, each session above the global session in the first stack that includes at least one identifier of at least one tile of the one or more affected tiles.

18. The method of claim 11, further comprising:
allocating an redo record in the memory;
allocating a second stack in the redo record;
popping the collateral session from the first stack;
pushing the collateral session onto the second stack;
popping the target session from the first stack; and
pushing the target session onto the second stack.

19. The method of claim 18, further comprising:
receiving user input requesting the collateral session be redone;
redoing the target action;
popping the target session from the second stack;
pushing the target session onto the first stack;
redoing the collateral action;
popping the collateral session from the second stack; and
pushing the collateral session onto the first stack.

20. A non-transitory computer readable medium storing computer executable instructions configured to instruct at least one processor to execute a method for providing out of order access to reversal operations, the method comprising:
providing image content to a user;
receiving user input requesting one or more actions be executed on information descriptive of the image content;
allocating an undo record in the memory;
allocating a stack in the undo record;
storing, within the stack, one or more sessions descriptive of the one or more actions, each session of the one or more sessions including at least one identifier of at least one tile that is affected by a respective action of the one or more actions, the at least one tile being associated with the image content;
receiving user input requesting a target session of the one or more sessions be undone, the target session identifying a target action having affected one or more tiles, the one or more affected tiles being associated with the image content;
identifying a collateral session of the one or more sessions that is above the target session in the first stack and that includes an identifier of a collateral action and at least one identifier of at least one tile of the one or more affected tiles;
undoing the collateral action; and
undoing the target action.

* * * * *